US012608642B2

(12) United States Patent (10) Patent No.: US 12,608,642 B2
Hasegawa (45) Date of Patent: Apr. 21, 2026

(54) MODEL PARAMETER LEARNING METHOD AND MOVEMENT MODE DETERMINATION METHOD

(71) Applicant: HONDA MOTOR CO., LTD., Tokyo (JP)

(72) Inventor: Yuji Hasegawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 1107 days.

(21) Appl. No.: 17/459,157

(22) Filed: Aug. 27, 2021

(65) Prior Publication Data

US 2022/0076163 A1     Mar. 10, 2022

(30) Foreign Application Priority Data

Sep. 8, 2020    (JP) ................................. 2020-150405

(51) Int. Cl.
*G06N 20/00* (2019.01)
*G06F 18/2113* (2023.01)
*G06F 18/214* (2023.01)
*G06F 18/23* (2023.01)
*G06T 7/70* (2017.01)

(52) U.S. Cl.
CPC ......... *G06N 20/00* (2019.01); *G06F 18/2113* (2023.01); *G06F 18/214* (2023.01); *G06F 18/23* (2023.01); *G06T 7/70* (2017.01)

(58) Field of Classification Search
CPC ....... G06N 20/00; G06T 7/70; G06F 18/2113; G06F 18/214; G06F 18/23
See application file for complete search history.

(56) References Cited

U.S. PATENT DOCUMENTS

2018/0107217 A1      4/2018  Asada et al.
2019/0011272 A1*    1/2019  Chen .................. G01C 21/3407
2020/0019815 A1*    1/2020  Balu ................. G06F 18/24137
                     (Continued)

FOREIGN PATENT DOCUMENTS

WO      2020/136978      7/2020

OTHER PUBLICATIONS

German Office Action dated Jan. 23, 2025 issued in corresponding German patent application No. 102021121945.0; English translation included, 11 pages.

(Continued)

*Primary Examiner* — Alexey Shmatov
*Assistant Examiner* — Duy T Diep
(74) *Attorney, Agent, or Firm* — Rankin, Hill & Clark LLP

(57) ABSTRACT

A learning device 30 extracts feature amount vectors from link data in which movement trajectories of a reference pedestrian M1 and a nearby pedestrian M2 are linked, links the feature amount vectors to condition satisfying data, determines the number of clusters, clusters the feature amount vectors of all clusters corresponding to the number of clusters, acquires the condition satisfying data to which the feature amount vectors are linked as learning data when the clustering of the feature amount vectors of all clusters corresponding to the number of clusters has converged, and learns a model parameter of a movement mode model by a predetermined machine learning algorithm using the learning data.

3 Claims, 11 Drawing Sheets

(56)     References Cited

U.S. PATENT DOCUMENTS

2020/0379461 A1\* 12/2020 Singh .............. B60W 60/00276
2021/0347383 A1\* 11/2021 Siebert .............. G01C 21/3407

OTHER PUBLICATIONS

Mao et al., "A Novel Collision-Free Navigation Approach for Multiple Nonholonomic Robots Based on ORCA and Linear MPC", Mathematical Problems in Engineering, 2020, Article ID 4183427; 16 pages.

\* cited by examiner

ROAD SURFACE

Rw1

MOVEMENT
DISTANCE x y

A

Rw1 x y

MODEL PARAMETER LEARNING METHOD AND MOVEMENT MODE DETERMINATION METHOD

BACKGROUND

Technical Field

The present invention relates to a model parameter learning method of a movement mode model in a moving device, and the like.

Related Art

Conventionally, as a model parameter learning method, a method described in WO 2020/136978 A has already been proposed by the present applicant. In the model parameter learning method, a model parameter of a CNN is learned, and the CNN is for determining a movement direction of a robot when the robot moves in a crowd in a shopping mall, an airport, or the like.

In the model parameter learning method, a movement trajectory when a pedestrian as a reference (hereinafter, referred to as a "reference pedestrian") actually walks in a crowd and a movement trajectory of a pedestrian around the reference pedestrian (hereinafter, referred to as a "surrounding pedestrian") are acquired using a LIDAR. Then, the model parameter of the CNN is learned by using the results of acquiring the movement trajectory of the reference pedestrian and the movement trajectory of the surrounding pedestrian as learning data.

SUMMARY

As in the model parameter learning method of WO 2020/136978 A, when the results of acquiring the movement trajectory of the reference pedestrian and the movement trajectory of the surrounding pedestrian are used as the learning data, the results of acquiring the movement trajectory of the reference pedestrian and the movement trajectory of the surrounding pedestrian are likely to be biased depending on an acquired situation and environment. In a case where the learning of the model parameter of the CNN is performed using the learning data having such a large bias, there is a possibility that the model parameter cannot be appropriately learned. The occurrence of such a bias can be prevented by acquiring a large number of learning data, but in this case, the learning data is acquired more than necessary, and thus, the efficiency deteriorates. This problem also occurs when a moving device other than the robot is used, when a movement mode model other than the CNN is used, or when a movement trajectory of a moving object other than a pedestrian is acquired.

The present invention has been made to solve the above problems, and an object of the present invention is to provide a model parameter learning method and the like capable of efficiently and appropriately learning a model parameter of a movement mode model used when a moving device moves in an environment where a plurality of moving objects are present around the moving device.

The invention according to a first aspect is a model parameter learning method in which a learning device learns a model parameter of a movement mode model for determining a movement mode when a moving device moves to a destination under a condition that a plurality of moving objects are present around the moving device, the model parameter learning method performed by the learning device, including: a first step of acquiring, in a case where a first moving object moves to the destination while avoiding interference with each of a plurality of second moving objects under a condition that the plurality of second moving objects are present around the first moving object, link data which are data in which a time series of a first movement mode parameter representing the movement mode of the first moving object in each movement period and a time series of a plurality of second movement mode parameters respectively representing the movement modes of the plurality of second moving objects synchronized with the time series of the first movement mode parameter are linked to each other; a second step of extracting condition satisfying data which are link data satisfying a predetermined condition from the link data acquired in the first step, extracting feature amount vectors from the condition satisfying data, and linking the feature amount vectors to the condition satisfying data; a third step of determining, by a predetermined method, the number of clusters when clustering the feature amount vectors linked to the condition satisfying data in the second step; a fourth step of clustering, by a predetermined clustering method, the feature amount vectors of all clusters corresponding to the number of clusters determined in the third step; a fifth step of acquiring the condition satisfying data to which the feature amount vectors are linked as learning data when the clustering of the feature amount vectors of all the clusters corresponding to the number of clusters is completed; and a sixth step of learning the model parameter of the movement mode model by a predetermined machine learning algorithm using the learning data.

According to the model parameter learning method, in the first step, in a case where the first moving object moves to the destination while avoiding interference with each of the plurality of second moving objects under the condition that the plurality of second moving objects are present around the first moving object, the link data are acquired as the data in which the time series of the first movement mode parameter representing the movement mode of the first moving object and the time series of the plurality of second movement mode parameters respectively representing the movement modes of the plurality of second moving objects synchronized with the time series of the first movement mode parameter are linked to each other. Then, in the second step, the condition satisfying data which is link data satisfying the predetermined condition is extracted from the link data, the feature amount vectors are extracted from the condition satisfying data, and the feature amount vectors are linked to the condition satisfying data. Furthermore, by executing the third to fifth steps, the clustering of the feature amount vectors is performed, and the learning data are acquired. Further, in the sixth step, the model parameter of the movement mode model is learned by the predetermined machine learning algorithm using the learning data.

In this case, in the fifth step, when the clustering of the feature amount vectors of all the clusters corresponding to the number of clusters is completed, the condition satisfying data to which the feature amount vectors are linked are acquired as the learning data. Therefore, the learning data can be acquired as the link data in which the feature amount vectors are clustered so as not to be biased. As a result, the model parameter of the movement mode model can be efficiently and appropriately learned by learning the model parameter of the movement mode model by the predetermined machine learning algorithm using such learning data.

The invention according to a second aspect is the model parameter learning method according to the first aspect, in which in the second step, n data sets are set by selecting the condition satisfying data to which the feature amount vectors are linked, corresponding to the number n of second moving objects present in a predetermined region when the first moving object moves in the predetermined region, n being an integer of 1 or more, the third and fourth steps are individually executed for each of the n data sets, and in the fifth step, when the clustering of the feature amount vectors in all the n data sets is completed, data of which the numbers of condition satisfying data are adjusted to be the same as each other in the n data sets are acquired as the learning data.

In this case, in a case where the first moving object moves to the destination while avoiding interference with each of the plurality of second moving objects under the condition that the plurality of second moving objects are present around the first moving object, the number of second moving objects present around the first moving object tends to be small. In this regard, according to the model parameter learning method, in the second step, n data sets are set by selecting the condition satisfying data corresponding to the number n of second moving objects present in the predetermined region when the first moving object moves in the predetermined region. Then, the third and fourth steps are individually executed for each of the n data sets. Furthermore, in the fifth step, when the clustering of the feature amount vectors in all the n data sets is completed, data of which the numbers of condition satisfying data are adjusted to be the same as each other in the n data sets are acquired as the learning data, and therefore, it is possible to acquire the learning data while avoiding the influence of the bias of the data caused by the number of second moving objects. As a result, the model parameter of the movement mode model can be more appropriately learned. Note that "the numbers of condition satisfying data are adjusted to be the same as each other" in the present specification is not limited to adjusting the numbers of condition satisfying data to be the same as each other, and includes adjusting the numbers of condition satisfying data to be slightly different (for example, about one to three).

The invention according to a third aspect is the model parameter learning method according to the first or second aspect, in which in the second step, at least one of a condition that a movement distance of the first moving object is a predetermined distance or more or a condition that a movement trajectory of the first moving object does not have a portion whose curvature radius is a predetermined curvature radius or less is set as a primary condition, and satisfying the primary condition corresponds to satisfying the predetermined condition.

According to the model parameter learning method, the link data satisfying at least one of the condition that the movement distance of the first moving object is the predetermined distance or more or the condition that the movement trajectory of the first moving object does not have a portion whose curvature radius is the predetermined curvature radius or less is extracted as the condition satisfying data from the link data. Therefore, the learning data can be acquired using the data in which the movement mode of the first moving object is in a state suitable for learning, thereby improving a model parameter learning effect.

The invention according to a fourth aspect is the model parameter learning method according to the third aspect, in which in the second step, at least one of a condition that the first moving object enters the predetermined region and then exits the predetermined region when the first moving object moves in the predetermined region, a condition that one or more second moving objects are present in the predetermined region when the first moving object is moving in the predetermined region, a condition that an average movement speed of the first moving object in the predetermined region is between a predetermined upper limit value and a predetermined lower limit value, or a condition that an average movement speed of the second moving object in the predetermined region is between the predetermined upper limit value and the predetermined lower limit value is set as a secondary condition, and further satisfying the secondary condition in addition to the primary condition corresponds to satisfying the predetermined condition.

According to the model parameter learning method, in addition to the data satisfying the first condition, the link data satisfying at least one of the condition that the first moving object enters the predetermined region and then exits the predetermined region when the first moving object moves in the predetermined region, the condition that one or more second moving objects are present in the predetermined region when the first moving object is moving in the predetermined region, the condition that the average movement speed of the first moving object in the predetermined region is between the predetermined upper limit value and the predetermined lower limit value, or the condition that the average movement speed of the second moving object in the predetermined region is between the predetermined upper limit value and the predetermined lower limit value is extracted as the condition satisfying data from the link data. Therefore, the learning data can be acquired using the data in which the movement modes of the first moving object and the second moving object are in a state suitable for learning, thereby further improving the model parameter learning effect.

A movement mode determination method according to a fifth aspect includes determining, by a movement mode determination device, a movement mode of a moving device by using a movement mode model of which a model parameter is learned by the model parameter learning method according to any one of the first to fourth aspects.

According to the movement mode determination method, since the movement mode of the moving device is determined using the movement mode model of which the model parameter is learned as described above, it is possible to determine the movement mode of the moving device so that interference with a moving object present around the moving device can be avoided even in a case where the moving device moves to a destination under the condition that a plurality of moving objects are present around the moving device.

DETAILED DESCRIPTION

Hereinafter, a model parameter learning method according to an embodiment of the present invention will be described. In the model parameter learning method of the present embodiment, a model parameter of a convolutional neural network (CNN) to be described later as a movement mode model is learned, and this CNN is used when a movement trajectory of a robot 2 (see FIG. 1) is determined.

Figure 1:
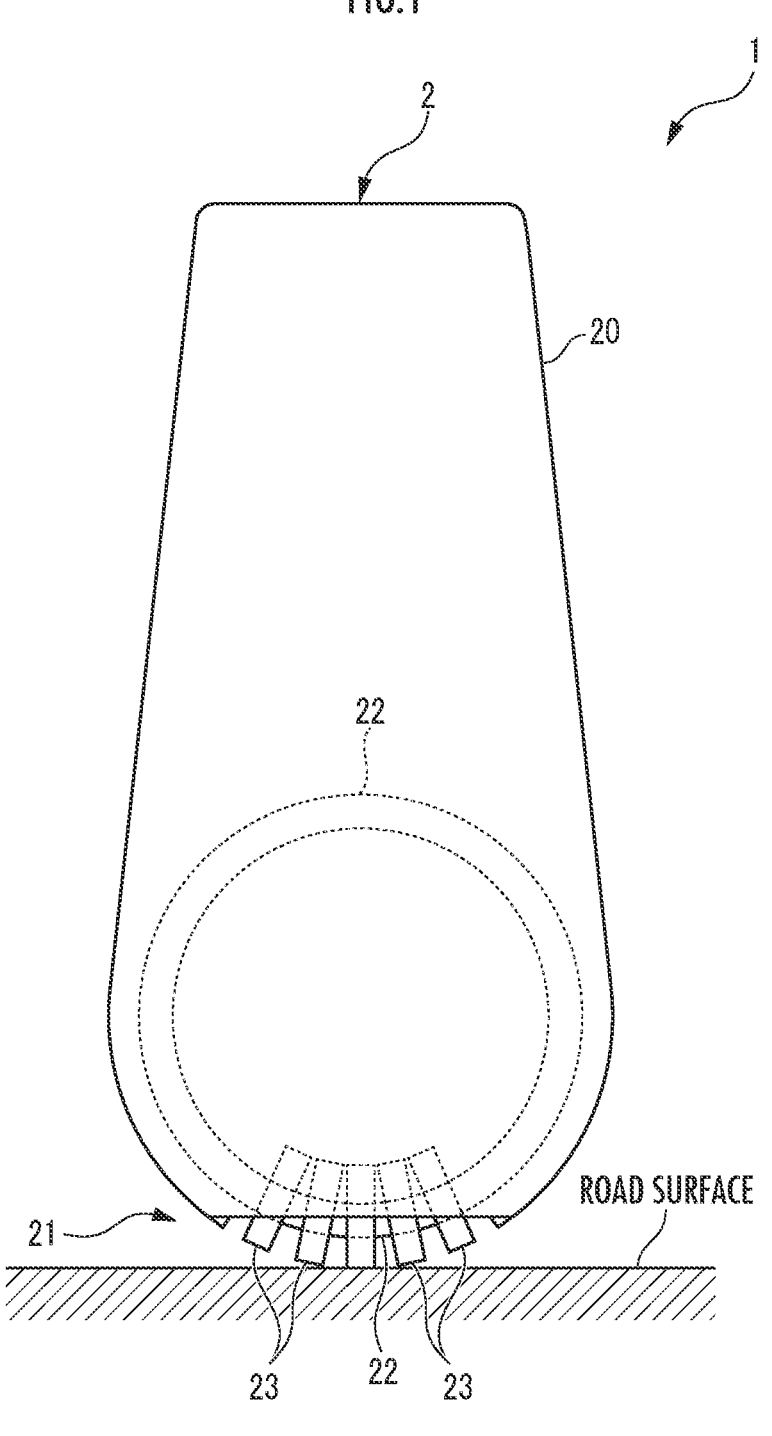
FIG. 1 is a view illustrating an appearance of a robot to which a model parameter learning method according to an embodiment of the present invention is applied.

First, a trajectory determination device 1 illustrated in FIG. 1 will be described. The trajectory determination device 1 is applied to the inverted pendulum type robot 2, and determines the movement trajectory of the robot 2 under a condition where a probability of presence of a traffic participant is high by a method to be described later. Note that, in the present embodiment, the trajectory determination device 1 corresponds to a movement mode determination device.

Figure 2:
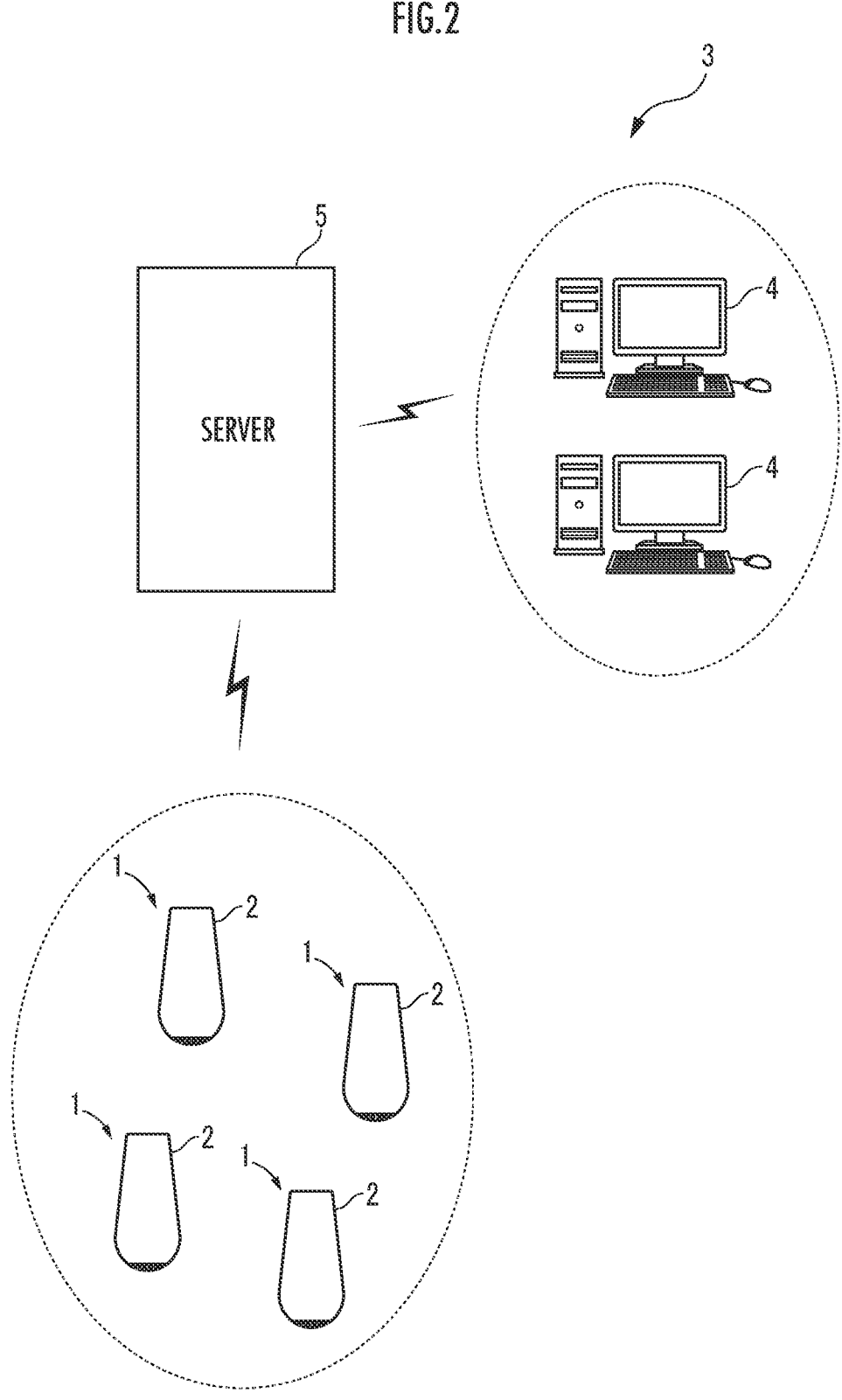
FIG. 2 is a diagram illustrating a configuration of a guidance system using the robot.

The robot 2 is of an autonomous movement type and is used in a guidance system 3 illustrated in FIG. 2. The guidance system 3 is of a type in which the robot 2 guides a user to a destination (for example, a store or a boarding gate) while leading the user in a shopping mall, an airport, or the like.

As illustrated in FIG. 2, the guidance system 3 includes a plurality of robots 2 that autonomously move in a predetermined region, an input device 4 which is provided separately from the plurality of robots 2 and to which the destination of the user is input, and a server 5 that can wirelessly communicate with the robots 2 and the input device 4.

The input device 4 is of a personal computer type, and when the destination of the user is input by the user (or an operator) operating a mouse and a keyboard, the input device 4 transmits a wireless signal indicating the destination to the server 5. Once the wireless signal is received from the input device 4, the server 5 sets, as a destination Po, the destination itself of the user or a relay point to the destination based on internal map data, and transmits a destination signal indicating the destination Po to the robot 2.

As will be described later, when the destination signal is received from the server 5 via a wireless communication device 14, a control device 10 in the robot 2 reads the destination Po included in the destination signal and determines a movement trajectory to the destination Po. In addition, the control device 10 acquires the position of the robot 2 by wireless communication with the server 5.

Next, a mechanical configuration of the robot 2 will be described. As illustrated in FIG. 1, the robot 2 includes a main body 20, a movement mechanism 21 provided in a lower portion of the main body 20, and the like, and is configured to be movable in all directions on a road surface by the movement mechanism 21.

Specifically, the movement mechanism 21 is configured similarly to that of JP 2017-56763 A, for example, and thus a detailed description thereof is omitted here. The movement mechanism 21 includes an annular core body 22, a plurality of rollers 23, a first actuator 24 (see FIG. 3), a second actuator 25 (see FIG. 3), and the like.

The plurality of rollers 23 are fitted onto the core body 22 so as to be arranged at equal angular intervals in a circumferential direction (around an axis) of the core body 22, and each of the plurality of rollers 23 is rotatable integrally with the core body 22 around the axis of the core body 22. Each of the rollers 23 is rotatable around a central axis (an axis in a tangential direction of a circumference having the axis of the core body 22 as the center) of a cross section of the core body 22 at an arrangement position of each of the rollers 23.

Furthermore, the first actuator 24 is implemented by an electric motor, and when a control input signal to be described later is input from the control device 10, the first actuator 24 rotates the core body 22 around the axis of the core body 22 via a drive mechanism (not illustrated).

On the other hand, similarly to the first actuator 24, the second actuator 25 is also implemented by an electric motor, and when a control input signal is input from the control device 10, the second actuator 25 rotates the roller 23 around the axis of the roller 23 via a drive mechanism (not illustrated). Accordingly, the main body 20 is driven by the first actuator 24 and the second actuator 25 so as to move in all directions on the road surface. With the above configuration, the robot 2 can move in all directions on the road surface.

Figure 3:
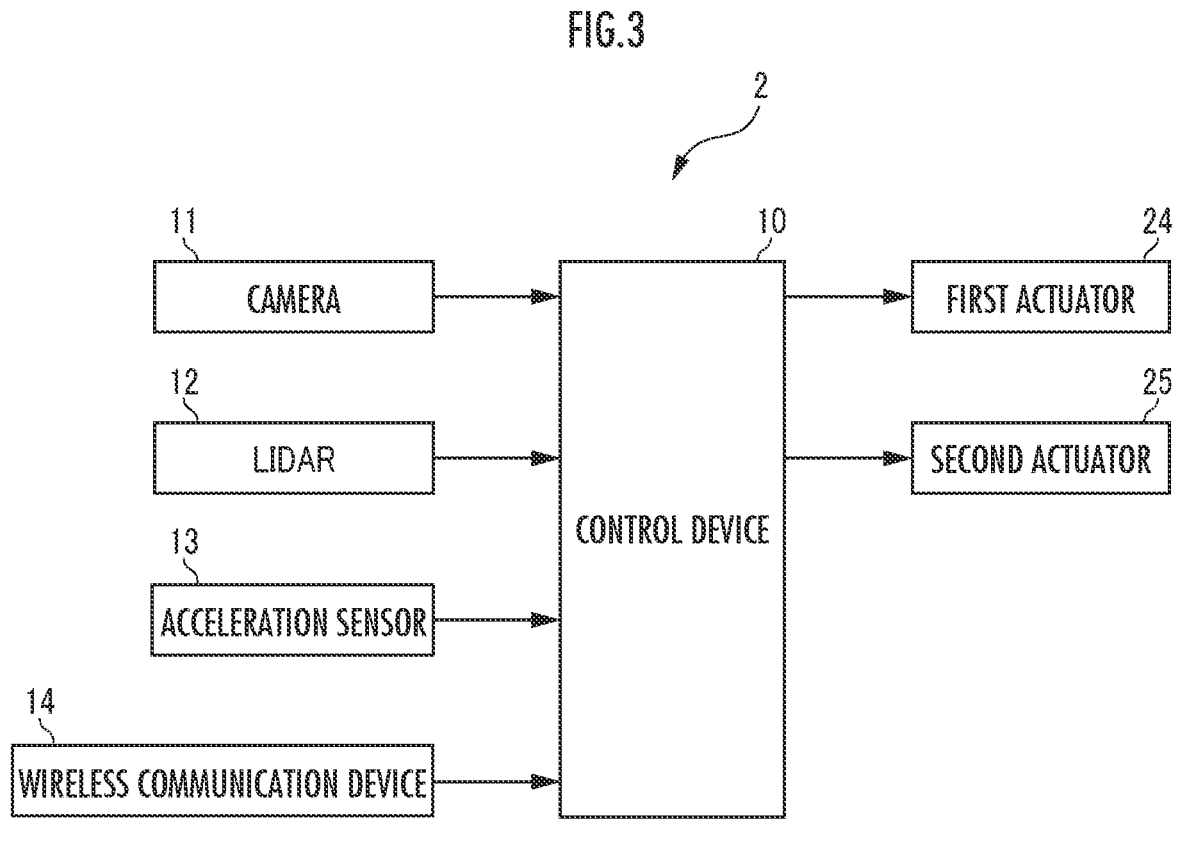
FIG. 3 is a block diagram illustrating an electrical configuration of the robot.

Next, an electrical configuration of the robot 2 will be described. As illustrated in FIG. 3, the robot 2 further includes the control device 10, a camera 11, a LIDAR 12, an acceleration sensor 13, and the wireless communication device 14.

The control device 10 is implemented by a microcomputer including a CPU, a RAM, a ROM, an E2PROM, an I/O interface, various electric circuits (not illustrated), and the like. In the E2PROM, map data of a location in which the robot 2 perform guiding and the CNN are stored. In this case, as the CNN, a CNN of which model parameters, that is, a weight of a connected layer and a bias term, have been sufficiently learned by a learning device 30 to be described later is stored.

The camera 11 captures an image of a surrounding environment of the robot 2 and outputs an image signal indicating the image to the control device 10. In addition, the LIDAR 12 measures, for example, a distance to an object in the surrounding environment by using laser light, and outputs a measurement signal indicating the distance to the control device 10. Further, the acceleration sensor 13 detects the acceleration of the robot 2 and outputs a detection signal indicating the acceleration to the control device 10.

The control device 10 estimates a self-position of the robot 2 by an adaptive Monte Carlo localization (amic) method by using the image signal of the camera 11 and the measurement signal of the LIDAR 12 described above. In addition, the control device 10 calculates an x-axis speed v_x and a y-axis speed v_y of the robot 2, which will be described later, based on the measurement signal of the LIDAR 12 and the detection signal of the acceleration sensor 13.

Furthermore, the wireless communication device 14 is electrically connected to the control device 10, and the control device 10 performs wireless communication with the server 5 via the wireless communication device 14.

Next, a configuration of the trajectory determination device 1 of the present embodiment and a principle of a trajectory determination method will be described. First, the learning device 30 illustrated in FIG. 4 will be described. The learning device 30 is for learning the model parameters (the weight of the connected layer and the bias term) of the CNN to be described later, and includes a LIDAR 31, a learning data creation unit 32, and a CNN learning unit 33. Specifically, these elements 32 to 33 are implemented by a computer (not illustrated) or the like.

Figure 4:
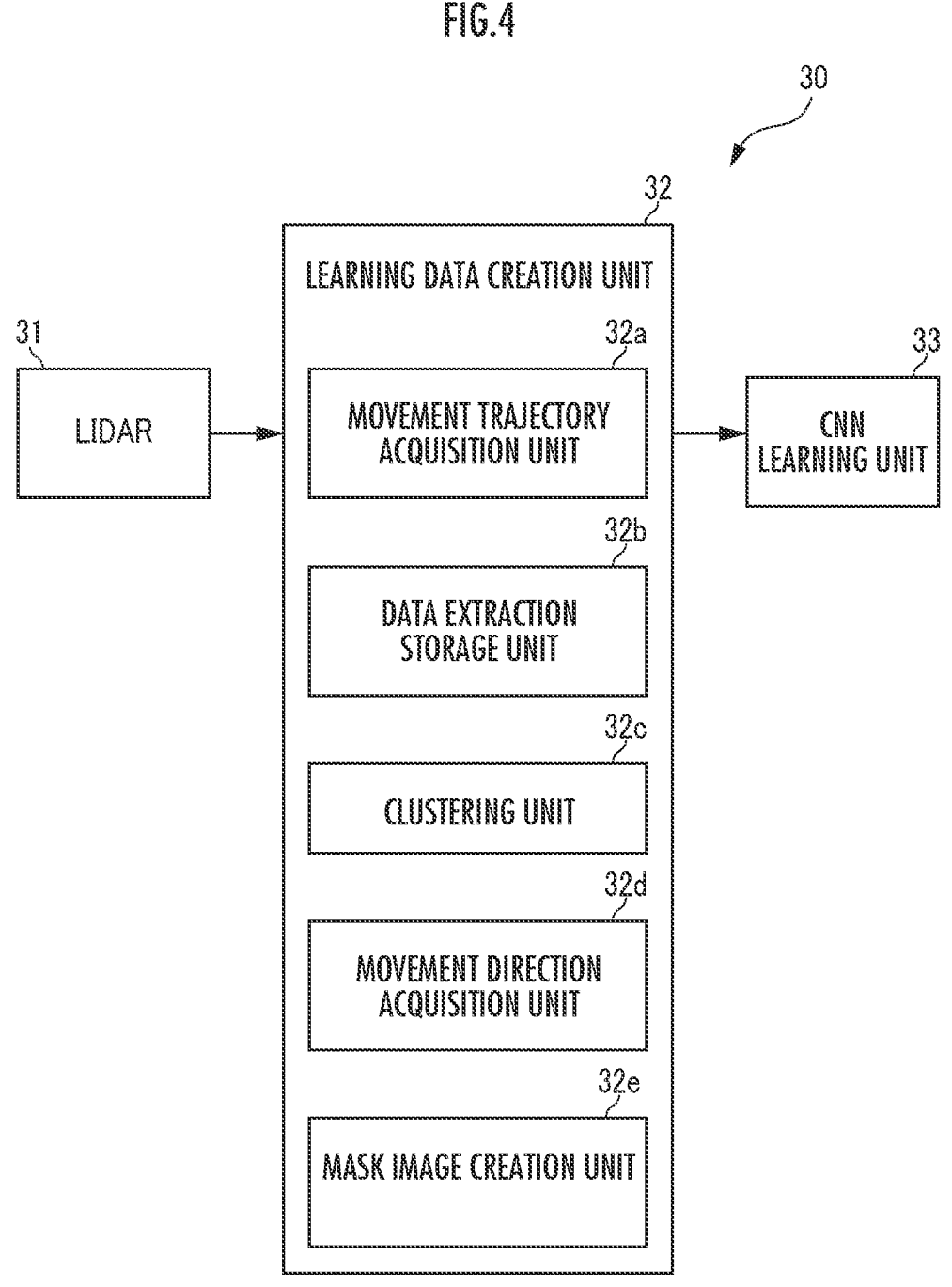
FIG. 4 is a block diagram illustrating a functional configuration of a learning device.

The learning data creation unit 32 creates learning data based on the measurement result of the LIDAR 31, and includes a movement trajectory acquisition unit 32a, a data extraction storage unit 32b, a clustering unit 32c, a movement direction acquisition unit 32d, and a mask image creation unit 32e as illustrated in FIG. 4. The movement trajectory acquisition unit 32a acquires a time series of a movement trajectory of a pedestrian as described below based on the measurement result of the LIDAR 31 in order to learn the movement trajectory of the pedestrian.

Figures 5, 6:
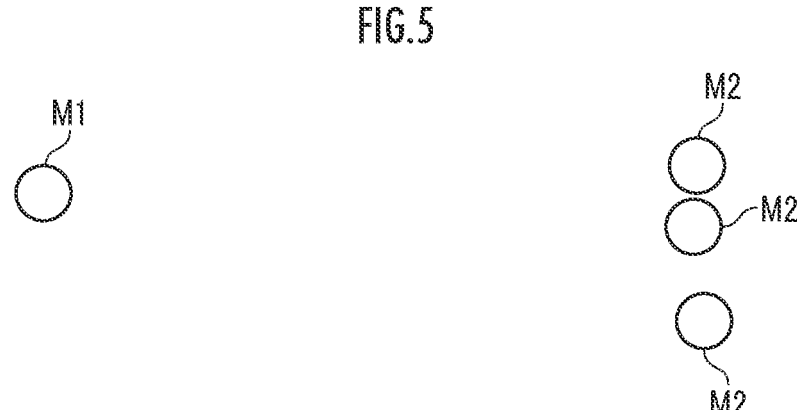
FIG. 5 is a plan view illustrating a positional relationship of pedestrians before acquisition of movement trajectories.
FIG. 6 is a plan view illustrating the movement trajectories when the pedestrians walk from the positions illustrated in FIG. 5.

For example, as illustrated in FIG. 5, in a crowded traffic environment in which a reference pedestrian M1 is set as a pedestrian who becomes a reference, and a plurality of (three in FIG. 5) pedestrians (hereinafter, referred to as "nearby pedestrians") M2 are present in an irregular arrangement in a moving direction of the reference pedestrian M1 in plan view, the LIDAR 31 measures a change of the position of the reference pedestrian M1 when the reference pedestrian M1 actually walks to a position illustrated in FIG. 6, and changes of the positions of the plurality of nearby pedestrians M2.

The measurement is performed when the reference pedestrian M1 walks to a destination many times under an environment in which the number of nearby pedestrians M2 varies, and the measurement results are input from the LIDAR 31 to the movement trajectory acquisition unit 32a. Then, based on the measurement results of the LIDAR 31, the movement trajectory acquisition unit 32a sequentially samples and stores a movement trajectory (hereinafter, referred to as a "first movement trajectory") Rw1 of the reference pedestrian M1 and a movement trajectory (hereinafter, referred to as a "second movement trajectory") Rw2 of the nearby pedestrian M2, for example, as illustrated in FIG. 6.

In this case, the first movement trajectory Rw1 and the second movement trajectory Rw2 are acquired as a time series of two-dimensional x-y coordinate values when an axis extending in the moving direction of the reference pedestrian M1 is defined as an x axis and an axis orthogonal to the moving direction of the reference pedestrian M1 is defined as a y axis.

As described above, when the reference pedestrian M1 walks to the destination many times, the movement trajectory acquisition unit 32a acquires the first movement trajectory Rw1 in a state of being linked to the movement trajectory Rw2 (see FIG. 6) of the nearby pedestrian M2 by the number of times. That is, link data of the first movement trajectory Rw1 and the second movement trajectory Rw2 is acquired by the number of times of walking of the reference pedestrian M1.

In this case, the reference pedestrian M1 does not need to be the same person, and for example, a plurality of different pedestrians may walk along a predetermined route once or more. In this case, changes of the positions of these pedestrians and the changes of the positions of the plurality of nearby pedestrians M2 may be measured by the LIDAR 31, and the measurement results may be input to the movement trajectory acquisition unit 32a.

In addition, in the data extraction storage unit 32b, data for clustering is extracted from the link data of the first movement trajectory Rw1 and the second movement trajectory Rw2 acquired by the movement trajectory acquisition unit 32a as described below and is stored.

First, data in which the reference pedestrian M1 satisfies all of the following conditions (f1) to (f2) is extracted as reference data from the link data of the first movement trajectory Rw1 and the second movement trajectory Rw2.

(f1) A movement distance of the reference pedestrian M1 is a predetermined distance or more.

(f2) The first movement trajectory Rw1 of the reference pedestrian M1 does not have a portion whose curvature radius is equal to or less than a predetermined curvature radius.

Figures 7, 8:
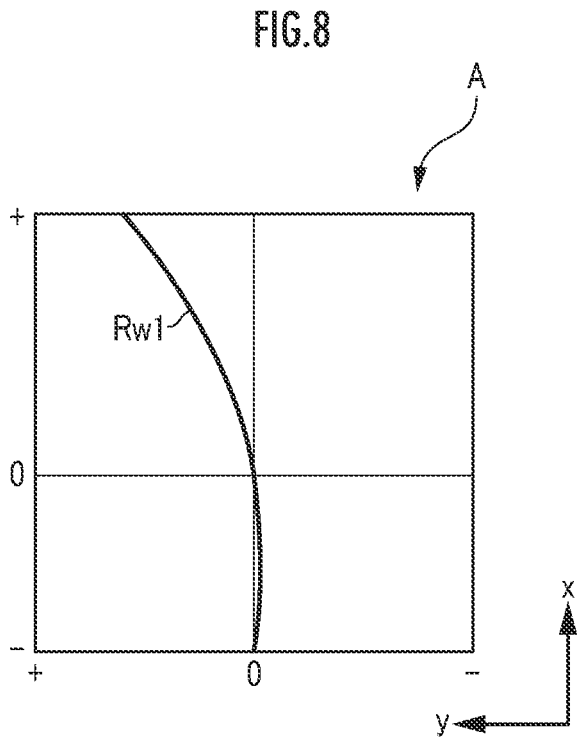
FIG. 7 is an explanatory diagram of a principle of calculating a movement distance of a reference pedestrian.
FIG. 8 is a diagram illustrating an example of a movement trajectory of the reference pedestrian in a target region.

The above condition (f1) is a condition for excluding data that is not suitable for learning if the reference pedestrian M1 does not walk to some extent or more. In this case, the movement distance of the reference pedestrian M1 is calculated as illustrated in FIG. 7. That is, the length of a diagonal line of a quadrangle determined by a maximum value and a minimum value of an x coordinate value and a maximum value and a minimum value of a y coordinate value in the first movement trajectory Rw1 is calculated as the movement distance of the reference pedestrian M1. Note that the movement distance of the reference pedestrian M1 may be calculated as a distance along the movement trajectory of the reference pedestrian M1.

In addition, the above condition (f2) is a condition for excluding, in a case where the first movement trajectory Rw1 of the reference pedestrian M1 has a portion whose curvature radius is equal to or less than the predetermined curvature radius, data that is not suitable for learning because the reference pedestrian M1 changes its direction drastically more than usual and takes a sudden avoidance action.

Next, condition satisfying data is extracted from the reference data extracted as described above by the following method. First, a region illustrated in FIG. 8 is defined as a target region A. The target region A is a rectangular predetermined region, and is set so that the position of the reference pedestrian M1 at a target time (a time when an avoidance action starts) is the origin, and the position of the reference pedestrian M1 when entering the target region A is y=0. Note that, in FIG. 8, only the first movement trajectory Rw1 is illustrated for easy understanding.

Next, in data of the reference pedestrian M1 and the nearby pedestrian M2 in the target region A, data of the reference pedestrian M1 and the nearby pedestrian M2 satisfying all of the following conditions (f3) to (f6) is extracted as condition satisfying data from the reference data.

(f3) There are a time when the reference pedestrian M1 enters the target region A and a time when the reference pedestrian M1 exits from the target region A.

(f4) One or more nearby pedestrians M2 are present in the target region A when the reference pedestrian M1 is moving in the target region A.

(f5) An average movement speed of the reference pedestrian M1 in the target region A is between a predetermined upper limit value and a predetermined lower limit value.

(f6) An average movement speed of the nearby pedestrian M2 in the target region A is between the predetermined upper limit value and the predetermined lower limit value.

The above conditions (f3) to (f6) are conditions for extracting only data suitable for learning, similarly to the above conditions (f1) to (f2). For example, the condition (f3)

is a condition for excluding data in a case where the movement distance of the reference pedestrian M1 in the target region A is small, and the condition (f4) is a condition for excluding data in a case where there is no nearby pedestrian M2 in the target region A. Further, the condition (f5) is a condition for extracting data in which the walking speed of the reference pedestrian M1 is in a walking speed region suitable for learning, and the condition (f6) is a condition for extracting data in which a walking speed of the nearby pedestrian M2 is in the walking speed region suitable for learning.

Figure 9:
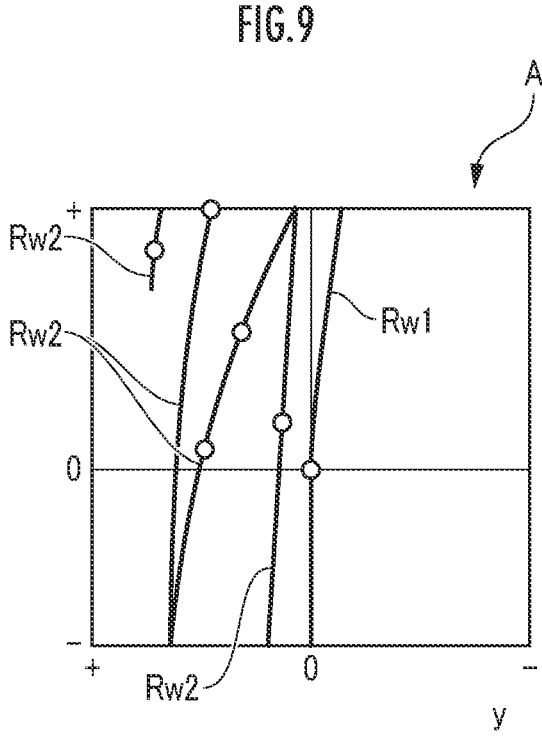
FIG. 9 is a diagram illustrating an example of extraction of movement trajectories of the reference pedestrian and nearby pedestrians in the target region.

In a case where the condition satisfying data is extracted from the reference data under the above conditions (f3) to (f6), for example, data as illustrated in FIG. 9 is obtained. FIG. 9 is an example in a case where the number of nearby pedestrians M2 is five, the position of the reference pedestrian M1 indicated by ○ is the position at the target time, and the position of the nearby pedestrian M2 indicated by ○ is the position of the nearby pedestrian M2 when the reference pedestrian M1 is at the position at the target time.

Next, from the condition satisfying data extracted as described above, a feature amount vector is calculated as described below. Specifically, the feature amount vector is calculated (set) by performing the following procedures (c1) to (c6). Note that, in the following description, an example in which one nearby pedestrian M2 is present in the target region A in addition to the reference pedestrian M1 will be described.

(c1) The average movement speed of the reference pedestrian M1 in the target region A is set as one element of the feature amount vector.

(c2) A position P1 (x coordinate value and y coordinate value) at which the reference pedestrian M1 exits the target region A is extracted and converted into an angle. Specifically, as illustrated in FIG. 10, an angle $\theta$ between a straight line L1 passing through the y axis and a straight line L2 extending from the origin and passing through the position at which the reference pedestrian M1 exits the target region A is calculated and set as one element of the feature amount vector.

(c3) The average movement speed of the nearby pedestrian M2 in the target region A is set as one element of the feature amount vector.

(c4) A distance between the origin and the first position P2 of the nearby pedestrian M2 in the target region A, a distance between the origin and a position P3 of the nearby pedestrian M2 at the target time, and a distance between the origin and the last position P4 of the nearby pedestrian M2 in the target region A are calculated, and these three distances are set as three elements of the feature amount vector.

Figure 10:
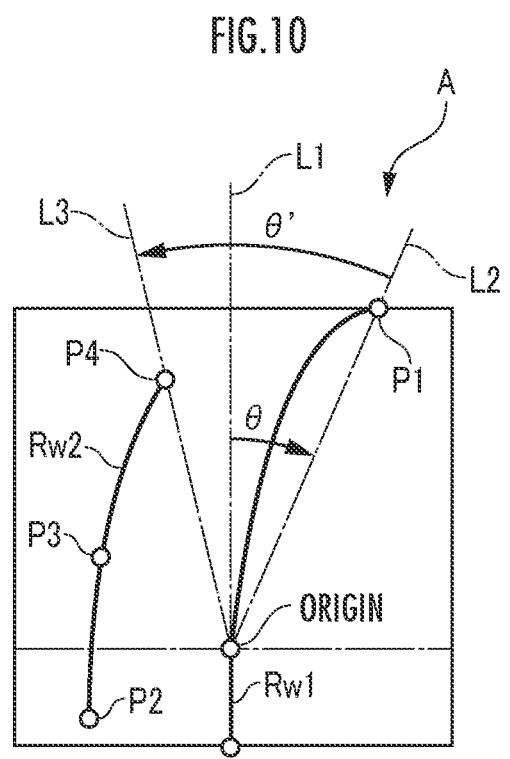
FIG. 10 is an explanatory diagram of a principle of calculating elements of a feature amount vector.

(c5) As illustrated in FIG. 10, an angle $\theta'$ between straight line L2 described above and a straight line L3 extending from the origin and passing through the position at which the reference pedestrian M1 exits the target region A is calculated. In this case, the angle $\theta'$ is calculated with the counterclockwise direction in FIG. 10 as a positive value. Then, sin $\theta'$ and cos $\theta'$ are calculated, and these values are set as three elements of the feature amount vector. In this case, sin $\theta'$ and cos $\theta'$ are used instead of the angle $\theta'$ because the above-described three distances are different between a case where $\theta'=180°$ and a case where $\theta'=-180°$.

(c6) As described above, the calculation of each element of the feature amount vector according to the procedures (c1) to (c5) is repeatedly performed, and after all of a large number of feature amount vectors are calculated, normalization of each element of a large number of feature amount vectors is performed. That is, the average value and the standard deviation of each element are calculated, and each element is normalized based on these values. Hereinafter, the feature amount vector whose each element is normalized is simply referred to as "feature amount vector".

In the data extraction storage unit 32b, after a large number of feature amount vectors are calculated as described above, each of the large number of feature amount vectors is associated with the condition satisfying data as an extraction source (the link data of the reference pedestrian M1 and the nearby pedestrian M2 in the target region A), thereby creating and storing the data for clustering.

In this case, the data for clustering are selectively stored as n sets of data corresponding to the number of nearby pedestrians M2 (1 to n) (n is more than ten) in the target region A. Hereinafter, regarding the data for clustering, a data set in a case where the number of nearby pedestrians M2 in the target region A is one is referred to as a "one-person data set", and a data set in a case where the number of nearby pedestrians M2 in the target region A is two is referred to as a "two-person data set". The same applies to a data set in a case where the number of nearby pedestrians M2 in the target region A is three or more.

Next, the clustering unit 32c will be described. In the clustering unit 32c, the data for clustering stored in the data extraction storage unit 32b is clustered by a k-means method described below based on the feature amount vector, thereby determining trajectory data for learning (the link data of the first movement trajectory Rw1 and the second movement trajectory Rw2).

Figure 11:
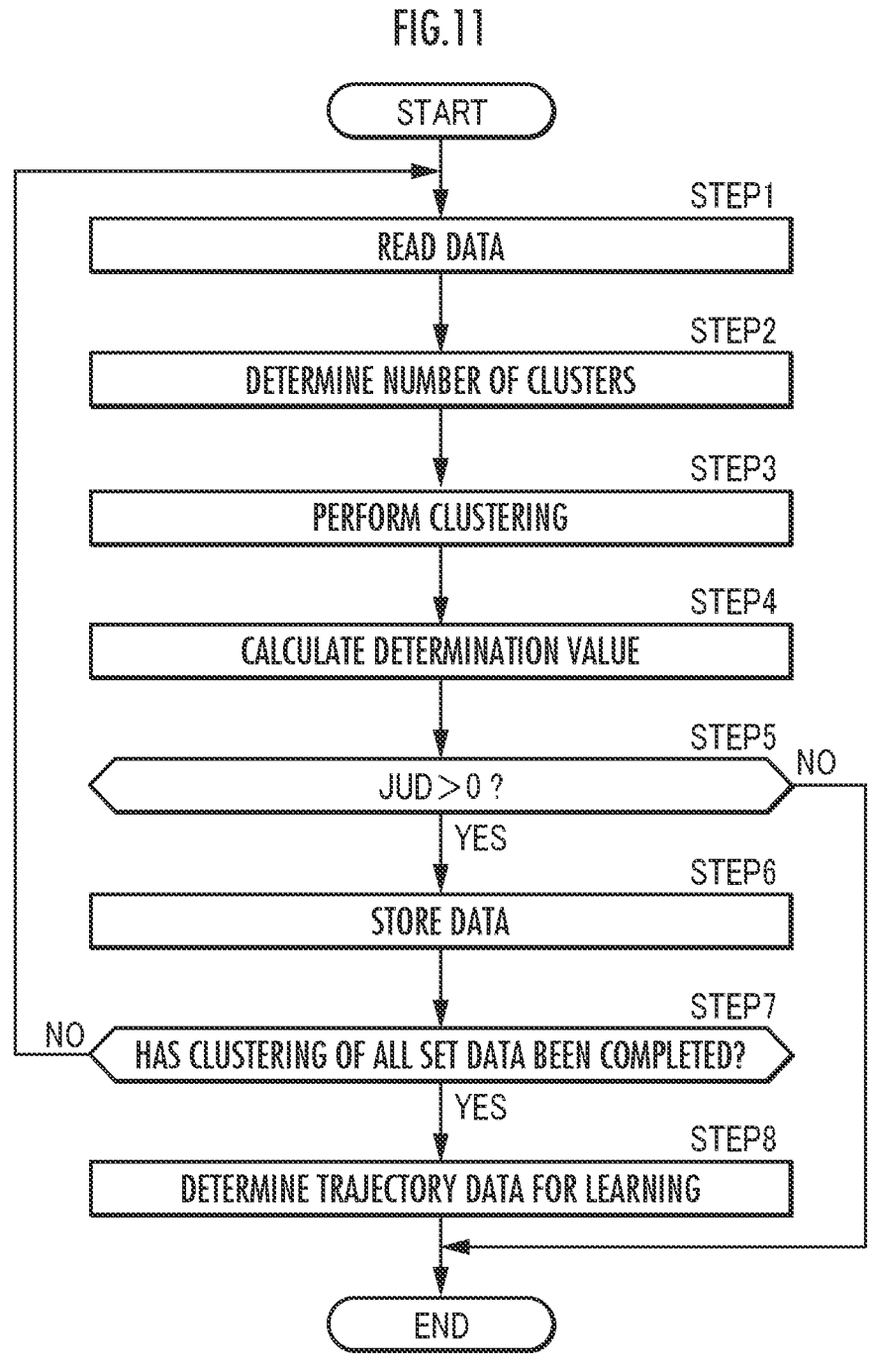
FIG. 11 is a flowchart illustrating clustering processing.

Specifically, in the clustering unit 32c, clustering processing illustrated in FIG. 11 is executed in order to determine the trajectory data for learning. As illustrated in FIG. 11, in the clustering process, first, data reading process is executed (FIG. 11/STEP1). In the data reading processing, at the time of the first execution, the one-person data set is read from the data sets for clustering stored in the data extraction storage unit 32b described above.

At the time of the first and subsequent executions, a data set corresponding to the smallest number of nearby pedestrians M2 is read from the data sets for clustering for which data reading has not been performed. That is, at the time of the second execution, the two-person data set is read from the data sets for clustering, and at the time of the third execution, a three-person data set is read from the data sets for clustering.

Following this data reading processing, cluster number determination processing is executed (FIG. 11/STEP2). In this cluster number determination processing, the number of clusters in the k-means method is determined by executing calculation processing of (d1) to (d3) to be described below. Note that, in the present embodiment, the calculation processing of (d1) to (d3) corresponds to a predetermined method.

(d1) The feature amount vectors in the read data for clustering are clustered into two clusters to m clusters (m is an integer of several hundreds), and the intra-class sum of squared errors SSEi (i=2 to m) for each number of clusters is calculated.

(d2) An average value $\Delta$SSEave of $\Delta$SSEi (=SSEi−SSEi+1) is calculated.

(d3) In $\Delta$SSEi smaller than the average value $\Delta$SSEave, a value obtained by converting the smallest value of the subscript i into an integer is determined as the number of clusters.

Next, the clustering is performed (FIG. 11/STEP3). Specifically, the clustering of the feature amount vectors described above is performed by the k-means method.

Next, determination value calculation processing is executed (FIG. 11/STEP4). In the determination value calculation processing, a determination value JUD for determining the convergence of the clustering is calculated by executing the processing of (d4) to (d6) described below.

(d4) After data is randomly excluded from the data of the feature amount vector used for the clustering and the remaining data are clustered by the k-means method, a sum Der (er is an exclusion rate) of distances between centroids (central points) is calculated.

(d5) Three values a to c are calculated by fitting the sum Der to an equation y=a+c·exp (b·x). Specifically, three values a to c are calculated by substituting the sum Der into y and the exclusion rate er into x.

(d6) The determination value JUD is calculated by substituting the values b and c calculated above into the following Equation (1).

$$JUD=[1-\ln(c)]/b \qquad (1)$$

Next, it is determined whether or not JUD>0 (FIG. 11/STEP5). In a case where it is determined that JUD>0 (FIG. 11/STEP5 . . . YES) and the clustering has converged, the clustered data is stored in the data extraction storage unit 32b described above. Note that, in the present embodiment, a case where JUD>0 corresponds to a case where the clustering is completed.

Next, it is determined whether or not the clustering of all the set data has been completed (FIG. 11/STEP7). That is, it is determined whether or not the clustering of all the data sets from the one-person data set to the n-person data set has been completed.

In a case where it is determined that the clustering of all the set data has not been completed (FIG. 11/STEP7 . . . NO), the processing in and after STEP1 described above are executed again.

On the other hand, in a case where it is determined that the clustering of all the set data has been completed (FIG. 11/STEP7 . . . YES), processing of determining the trajectory data for learning is executed (FIG. 11/STEP8).

In this processing of determining the trajectory data for learning, the trajectory data for learning is determined as described below. First, a data set having the smallest number of data is selected from the data sets from the one-person data set to the n-person data set for which the clustering has been completed and which are stored in the data extraction storage unit 32b, and data is randomly selected so that each number of data is the same as the number of data of the data set having the smallest number of data in all data sets. Then, as described above, the data of which the numbers of data are the same as each other in all the data sets are determined as the trajectory data for learning. After the processing of determining the trajectory data for learning is executed as described above, this processing ends.

On the other hand, in a case where JUD is not larger than 0 (FIG. 11/STEP5 . . . NO) and the clustering has not converged, the clustering processing ends. In this case, in the movement trajectory acquisition unit 32a and the data extraction storage unit 32b described above, the data set for clustering is created as described above for the data set whose clustering has not converged. Then, as described above, the clustering processing is executed again in the clustering unit 32c.

In addition, in the movement direction acquisition unit 32d described above, a time series of a movement direction command of the reference pedestrian M1 is set as a vector value having three directions including a "left direction", a "center direction", and a "right direction" as elements based on the trajectory data for learning created by the clustering unit 32c and the measurement result of the LIDAR 31. In a case of the movement direction command, for example, when the reference pedestrian M1 is moving straight, the "center direction" is set to 1, and the "left direction" and "right direction" are set to 0.

When the reference pedestrian M1 is moving in the right direction, the "right direction" is set to 1, and the other directions are set to 0. In this case, the "right direction" is set to 1 when the reference pedestrian M1 moves rightward by a predetermined angle θ or more with respect to the straight movement direction. Further, when the reference pedestrian M1 is moving in the left direction, the "left direction" is set to 1, and the other directions are set to 0. In this case, the "left direction" is set to 1 when the reference pedestrian M1 moves leftward by the predetermined angle θ or more with respect to the straight movement direction.

Figure 12:
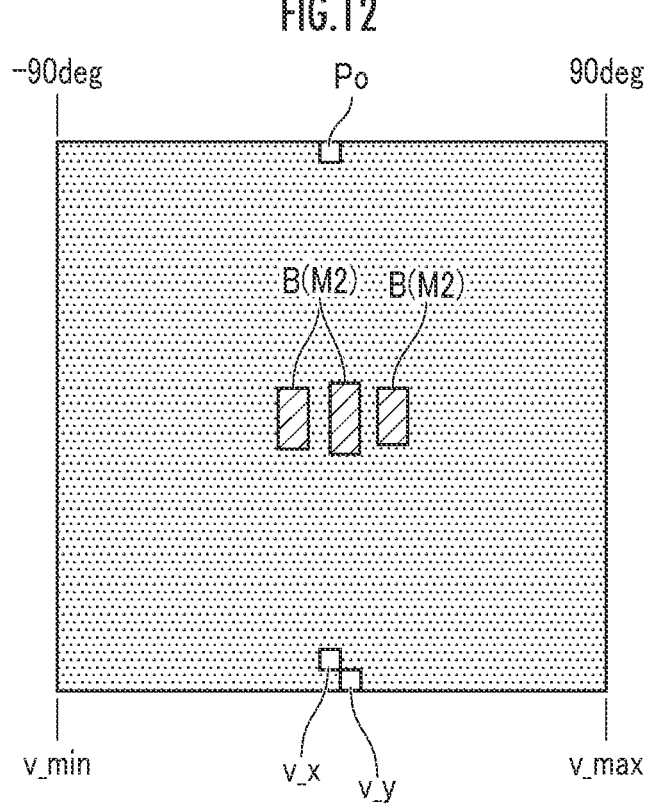
FIG. 12 is a diagram illustrating a mask image created by a mask image creation unit.

Furthermore, the mask image creation unit 32e described above creates a time series of a mask image (see FIG. 12) based on the trajectory data for learning created by the clustering unit 32c and the measurement result of the LIDAR 31. The mask image indicates the arrangement of the nearby pedestrians M2 present in the field of view of the reference pedestrian M1. For example, when three nearby pedestrians M2 are present as illustrated in FIG. 12, the positions of these nearby pedestrians M2 are displayed as three rectangular boxes B. In FIG. 12, regions indicated by broken lines of the three boxes B are actually displayed in red, and the other regions indicated by dots are actually displayed in black.

At the same time, the position of the destination Po at the time of measurement is displayed as a rectangular white box in an upper end portion of the mask image. The destination Po is set as a value within a range of −90 deg to 90 deg with the center position in front of the current self-position of the reference pedestrian M1 as a reference being 0 deg.

Furthermore, the x-axis speed v_x and the y-axis speed v_y of the reference pedestrian M1 are displayed as two rectangular white boxes at a lower end of the mask image. The x-axis speed v_x and the y-axis speed v_y are speed components of the reference pedestrian M1 in an x-axis direction and a y-axis direction, respectively, and are set as values within a range of a minimum movement speed v_min (for example, 0) and a maximum movement speed v_max of the reference pedestrian M1.

The learning data creation unit 32 creates a large number of learning data by linking the time series of the movement direction command of the reference pedestrian M1 and the time series of the mask image acquired as described above, the time series being synchronized with each other. These learning data are input from the learning data creation unit 32 to the CNN learning unit 33.

Figure 13:
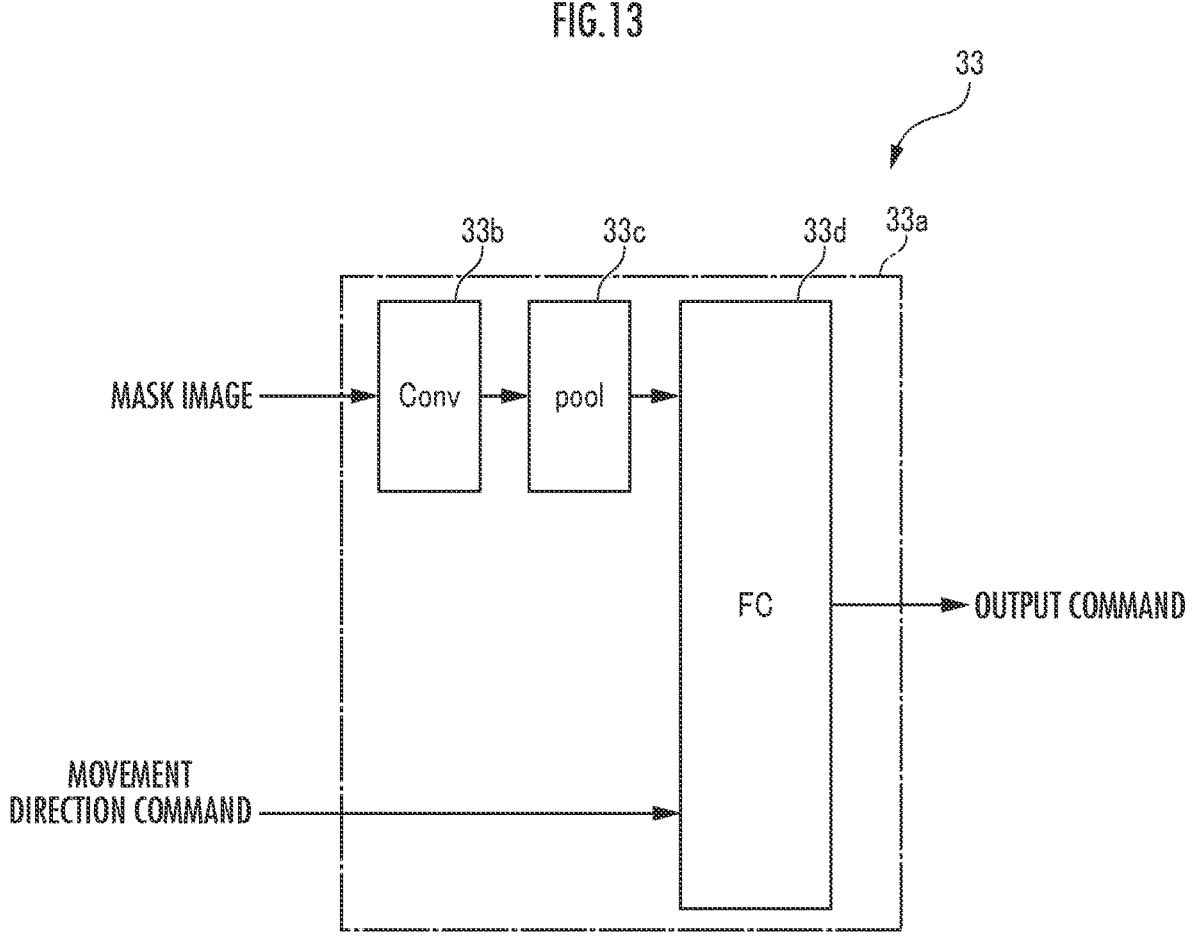
FIG. 13 is a block diagram illustrating a functional configuration of a CNN learning unit.

As illustrated in FIG. 13, the CNN learning unit 33 includes a CNN 33a, and the CNN 33a includes a convolutional layer (indicated as Conv in FIG. 13) 33b, a pooling layer (indicated as pool in FIG. 13) 33c, and a fully connected layer (indicated as FC in FIG. 13) 33d. In the CNN 33a, a plurality of sets of the convolutional layers 33b and the pooling layers 33c (only one set is illustrated) are alternately arranged, and the fully connected layer 33d includes a plurality of connected layers (not illustrated). Note that, in the present embodiment, the CNN 33a corresponds to the movement mode model.

In the CNN 33*a*, in a case where learning data is input from the learning data creation unit 32, the mask image of the learning data is input to the convolutional layer 33*b* as the uppermost layer of the CNN 33*a*, and thereafter, the output of the pooling layer 33*c* as the lowermost layer is input to the fully connected layer 33*d*. The movement direction command is also input to the fully connected layer 33*d*.

Then, the output of the pooling layer 33*c* as the lowermost layer and the movement direction command are connected in the fully connected layer 33*d*, such that an output command is output from the fully connected layer 33*d*. The output command has three labels ("left direction", "center direction", and "right direction") which are the same as those of the movement direction command, and is output as a value representing the probability of these labels.

The CNN learning unit 33 calculates the weight and the bias term of the fully connected layer 33*d* of the CNN 33*a* by a back propagation method using a loss function (for example, a mean squared error) of the movement direction command and the output command. That is, learning computation of the model parameter of the CNN 33*a* is performed. Then, by performing the above learning computation many times, the learning computation of the model parameter of the CNN 33*a* in the CNN learning unit 33 is terminated. In the learning device 30, the learning of the model parameter of the CNN 33*a* is performed as described above.

Next, a configuration of the trajectory determination device 1 of the present embodiment will be described with reference to FIG. 14. The trajectory determination device 1 determines (calculates) a movement speed command v as a trajectory of the robot 2 by the following method, and the movement speed command v includes, as elements, a target x-axis speed v_x_cmd and a target y-axis speed v_y_cmd that are target values of the x-axis speed v_x and the y-axis speed v_y of the robot 2.

Figure 14:
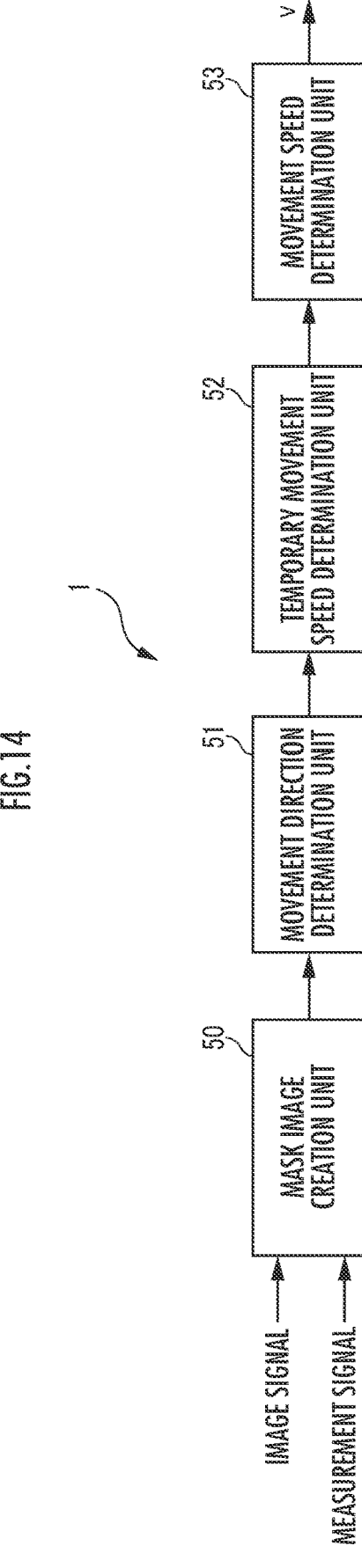
FIG. 14 is a block diagram illustrating a functional configuration of a trajectory determination device.

As illustrated in FIG. 14, the trajectory determination device 1 includes a mask image creation unit 50, a movement direction determination unit 51, a temporary movement speed determination unit 52, and a movement speed determination unit 53, and these elements 50 to 53 are specifically implemented by the control device 10.

First, the mask image creation unit 50 will be described. In the mask image creation unit 50, when the image signal from the camera 11 and the measurement signal from the LIDAR 12 are input, the mask image is created by a single shot multibox detector (SSD) method.

In the mask image, similarly to the boxes B of the mask image in FIG. 12 described above, a box (not illustrated) of a traffic participant including a preceding pedestrian is displayed, and the x-axis speed v_x and the y-axis speed v_y of the robot 2, and the destination Po (which are not illustrated) are displayed.

In this case, the position and the size of the traffic participant are determined based on the image signal of the camera 11 and the measurement signal of the LIDAR 12. The x-axis speed v_x and the y-axis speed v_y of the robot 2 are determined based on the measurement signal of the LIDAR 12 and the detection signal of the acceleration sensor 13. Furthermore, the destination Po is determined by the destination signal (not illustrated) from the server 5. The mask image created as described above is output from the mask image creation unit 50 to the movement direction determination unit 51.

On the other hand, the movement direction determination unit 51 includes the CNN (not illustrated) of which a model parameter has been learned by the CNN learning unit 33 described above, and determines the movement direction of the robot 2 as follows using the CNN.

First, in the movement direction determination unit 51, when the mask image from the mask image creation unit 50 is input to the CNN, the above-described output command is output from the CNN. Next, the direction of the element having the maximum value among the three elements ("left direction". "center direction", and "right direction") of the output command is determined as the movement direction of the robot 2. The movement direction of the robot 2 determined as described above is output from the movement direction determination unit 51 to the temporary movement speed determination unit 52.

The temporary movement speed determination unit 52 calculates a temporary movement speed command v_cnn based on the movement direction of the robot 2 from the movement direction determination unit 51 and the x-axis speed v_x and the y-axis speed v_y of the robot 2. The temporary movement speed command v_cnn includes a temporary value v_x_cnn of the x-axis speed of the robot 2 and a temporary value v_y_cnn of the y-axis speed as elements. Subsequently, the temporary movement speed command v_cnn of the robot 2 determined as described above is output from the temporary movement speed determination unit 52 to the movement speed determination unit 53.

The movement speed determination unit 53 determines the movement speed command v by an algorithm to which a dynamic window approach (DWA) is applied based on the temporary movement speed command v_cnn. The movement speed command v includes the target x-axis speed v_x_cmd and the target y-axis speed v_y_cmd as elements.

In the trajectory determination device 1 of the present embodiment, the movement speed command v including the target x-axis speed v_x_cmd and the target y-axis speed v_y_cmd as elements is determined as described above. Then, the first and second actuators 24 and 25 are controlled so that the robot 2 moves according to the movement speed command v.

As described above, according to the model parameter learning method of the present embodiment, in the movement trajectory acquisition unit 32*a*, the link data of the first movement trajectory Rw1 and the second movement trajectory Rw2 is acquired, and in the data extraction storage unit 32*b*, data satisfying all of the conditions (f1) to (f6) described above is acquired as the condition satisfying data from the link data of the first movement trajectory Rw1 and the second movement trajectory Rw2, the feature amount vector is calculated from the condition satisfying data by the procedures (c1) to (c6), and the data for clustering are acquired and stored as data in which the feature amount vector is linked to the condition satisfying data. At this time, the data for clustering are selectively stored as n data sets corresponding to the number n of nearby pedestrians M2 in the target region A.

In addition, the clustering unit 32*c* executes the clustering processing of FIG. 11 on each of the n data sets stored in the data extraction storage unit 32*b* in ascending order of the number n of nearby pedestrians M2, thereby acquiring the trajectory data for learning. In the clustering processing, the number of clusters is determined, and clustering of feature amount vectors is performed. Then, when the clustering of all the n data sets is completed, data of which the numbers of data are the same as each other in all the data sets are acquired as the trajectory data for learning.

Since the feature amount vectors are clustered in this manner, the trajectory data for learning to which the feature amount vectors are linked can be acquired as data clustered without bias. In addition, since the trajectory data for learning are acquired so that the numbers of link data of each of all clusters are the same as each other, it is possible to ensure the uniformity of the trajectory data for learning.

Furthermore, in the movement direction acquisition unit 32d, the time series of the movement direction command of the reference pedestrian M1 at the time of sampling is acquired (calculated) based on the trajectory data for learning created by the clustering unit 32c and the measurement result of the LIDAR 31, and in the mask image creation unit 32e, the time series of the mask image is created based on the trajectory data for learning created by the clustering unit 32c and the measurement result of the LIDAR 31, and the learning of the model parameter of the CNN 33a is performed using the time series of the movement direction command and the time series of the mask image as the learning data.

As described above, the mask image is created using the trajectory data for learning clustered without bias, and such a mask image is used as the learning data to learn the model parameter of the CNN 33a, such that the model parameter can be efficiently and appropriately learned.

Furthermore, since the conditions (f1) to (f6) described above are for determining that the movement modes of the reference pedestrian M1 and the nearby pedestrian M2 are in a state suitable for learning, the learning data can be acquired using data in which the movement modes of the reference pedestrian M1 and the nearby pedestrian M2 are in a state suitable for learning. As a result, the model parameter can be more effectively learned.

In addition, the movement direction determination unit 51 of the trajectory determination device 1 determines the movement direction of the robot 2 by using the CNN of which the model parameter has been learned by the CNN learning unit 33. Therefore, even when the robot 2 moves in a crowded environment, the movement direction of the robot 2 can be appropriately determined so that interference with pedestrians present around the robot 2 can be avoided.

Note that, although the embodiment is an example in which the reference pedestrian M1 is used as a first moving object, the first moving object of the present invention is not limited thereto, and may be any moving object as long as it can move while avoiding interference with each of a plurality of second moving objects. For example, as the first moving object, an autonomous movement type robot may be used, or a vehicle capable of automatic driving may be used.

In addition, the embodiment is an example in which the nearby pedestrian M2 is used as the second moving object, but instead, an autonomous movement type robot, a vehicle capable of automatic driving, an animal, or the like may be used as the second moving object.

Furthermore, the moving object of the present invention may be a pedestrian, an autonomous movement type robot, a vehicle capable of automatic driving, an animal, or the like.

In addition, the embodiment is an example in which the robot 2 is used as the moving device, but the moving device of the present invention is not limited thereto, and may be any moving device as long as it moves to a destination under a condition where a plurality of moving objects are present around the moving device. For example, a vehicle-type robot or a biped walking robot may be used as the moving device.

Furthermore, the embodiment is an example in which the movement direction of the robot is used as the movement mode of the moving device, but the movement mode of the present invention is not limited thereto, and may be any mode as long as it represents the movement mode when the moving device moves to a destination. For example, the movement speeds (vx and vy) of the robot may be used as the movement mode. In this case, the CNN learning unit 33 may be configured to learn the model parameter of the CNN 33a whose output is the movement speed.

On the other hand, the embodiment is an example in which the CNN is used as the movement mode model, but the movement mode model of the present invention is not limited thereto, and may be any model as long as it determines the movement mode when the moving device moves to a destination. For example, a recurrent neural network (RNN), a deep Q-network (DQN), or the like may be used as the movement mode model.

In addition, the embodiment is an example in which the k-means method is used as the predetermined clustering method, but the predetermined clustering method of the present invention is not limited thereto, and may be any method as long as the clustering of the feature amount vectors is performed. For example, a hypervolume method or the like may be used as the predetermined clustering method. Furthermore, the embodiment is an example in which whether or not the clustering has converged is determined, but instead of this, it may be determined whether or not the clustering has been completed.

Furthermore, the embodiment is an example in which the back propagation method is used as the predetermined machine learning algorithm, but the predetermined machine learning algorithm of the present invention is not limited thereto, and may be any machine learning algorithm as long as it learns the model parameter of the movement mode model. For example, a support vector machine or the like may be used.

On the other hand, the embodiment is an example in which the target region A is used as the predetermined region, but the predetermined region of the present invention is not limited thereto, and may be any region where the first moving object and the second moving object move. For example, the predetermined region may be a polygonal region having five or more corners, or may be an elliptical or circular region.

In addition, the embodiment is an example in which the data extraction storage unit 32b extracts data satisfying all of the conditions (f1) to (f6) described above as the condition satisfying data from the link data of the first movement trajectory Rw1 and the second movement trajectory Rw2, but the data extraction storage unit 32b may also be configured to extract the condition satisfying data as follows.

For example, at least one of (f1) and (f2) described above may be set as a primary condition, and data satisfying the primary condition may be extracted as the condition satisfying data from the link data of the first movement trajectory Rw1 and the second movement trajectory Rw2. Further, at least one of the above-described secondary conditions (f3) to (f6) may be set as a secondary condition, and data satisfying the secondary condition in addition to the primary condition may be extracted as the condition satisfying data from the link data of the first movement trajectory Rw1 and the second movement trajectory Rw2.

REFERENCE SIGNS LIST

1 Trajectory determination device (movement mode determination device)

2 Robot (moving device)
30 Learning device
32 Learning data creation unit (sixth step)
32a Movement trajectory acquisition unit (first step)
32b Data extraction storage unit (second step)
32c Clustering unit (third to fifth steps)
33a CNN (movement mode model)
35 Environment information image (environment information)
M1 Reference pedestrian (first moving object)
M2 Nearby pedestrian (second moving object)
A Target region (predetermined region)

What is claimed is:

1. A movement mode determination method of a robot, performed to learn a movement of a first pedestrian with a plurality of second pedestrians surrounding the first pedestrian, where the first pedestrian and the plurality of second pedestrians are separate from the robot, and applying the movement that is learned to the robot, the movement mode determination method comprising:

learning, by a learning device, a model parameter of a movement model;

determining, by a movement mode determination device, a movement mode of the robot by using the movement mode model of which the model parameter is learned;

determining a movement trajectory of the robot using the movement mode; and controlling the robot to move autonomously by controlling an actuator driving a movement mechanism of the robot, so that the robot follows the movement trajectory while traveling in an area including pedestrians, wherein the model parameter is learned by a model parameter learning method in which the learning device learns the model parameter of the movement mode model for determining the movement mode when the robot moves to a destination under a condition that a plurality of pedestrians are present around the robot, the model parameter learning method performed by the learning device, comprising:

a first step of acquiring, in a case where the first pedestrian moves to the destination while avoiding interference with each of the plurality of second pedestrians under a condition that the plurality of second pedestrians are present around the first pedestrian, link data which are data in which a time series of a first movement mode parameter representing the movement mode of the first pedestrian in each movement period and a time series of a plurality of second movement mode parameters respectively representing the movement modes of the plurality of second pedestrians synchronized with the time series of the first movement mode parameter are linked to each other;

a second step of extracting condition satisfying data which are link data satisfying a predetermined condition from the link data acquired in the first step, extracting feature amount vectors from the condition satisfying data, and linking the feature amount vectors to the condition satisfying data, wherein a condition that a movement trajectory of the first pedestrian does not have a portion whose curvature radius is a predetermined curvature radius or less is set as a primary condition, and satisfying the primary condition corresponds to satisfying the predetermined condition;

a third step of determining, by a predetermined method, the number of clusters when clustering the feature amount vectors linked to the condition satisfying data in the second step;

a fourth step of clustering, by a predetermined clustering method, the feature amount vectors of all clusters corresponding to the number of clusters determined in the third step;

a fifth step of acquiring the condition satisfying data to which the feature amount vectors are linked as learning data in a case where the clustering of the feature amount vectors of all the clusters is completed; and a sixth step of learning the model parameter of the movement mode model by a predetermined machine learning algorithm using the learning data.

2. The movement mode determination method according to claim 1, wherein in the second step, n data sets are set by selecting the condition satisfying data to which the feature amount vectors are linked, corresponding to the number n of second pedestrians present in a predetermined region when the first pedestrian moves in the predetermined region, n being an integer of 1 or more, the third and fourth steps are individually executed for each of the n data sets, and in the fifth step, when the clustering of the feature amount vectors in all the n data sets is completed, data of which the numbers of condition satisfying data are adjusted to be the same as each other in the n data sets are acquired as the learning data.

3. The movement mode determination method according to claim 1, wherein in the second step, at least one of a condition that the first pedestrian enters a predetermined region and then exits the predetermined region when the first pedestrian moves in the predetermined region, a condition that one or more second pedestrians are present in the predetermined region when the first pedestrian is moving in the predetermined region, a condition that an average movement speed of the first pedestrian in the predetermined region is between a predetermined upper limit value and a predetermined lower limit value, and a condition that an average movement speed of the second pedestrian in the predetermined region is between the predetermined upper limit value and the predetermined lower limit value is set as a secondary condition, and further satisfying the secondary condition in addition to the primary condition corresponds to satisfying the predetermined condition.

* * * * *